United States Patent
Kou et al.

(10) Patent No.: US 10,216,243 B2
(45) Date of Patent: Feb. 26, 2019

(54) METHOD, DEVICE AND STORAGE MEDIUM FOR WAKING UP HOME INTERCONNECTION DEVICE

(71) Applicant: ZTE Corporation, Shenzhen, Guangdong (CN)

(72) Inventors: Ping Kou, Shenzhen (CN); Yingxin Li, Shenzhen (CN); Wei Jiang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 88 days.

(21) Appl. No.: 15/504,131

(22) PCT Filed: Mar. 31, 2015

(86) PCT No.: PCT/CN2015/075509
§ 371 (c)(1),
(2) Date: Feb. 15, 2017

(87) PCT Pub. No.: WO2016/026300
PCT Pub. Date: Feb. 25, 2016

(65) Prior Publication Data
US 2017/0277242 A1 Sep. 28, 2017

(30) Foreign Application Priority Data
Aug. 19, 2014 (CN) .......................... 2014 1 0413319

(51) Int. Cl.
*G06F 11/30* (2006.01)
*G06F 1/3209* (2019.01)
(Continued)

(52) U.S. Cl.
CPC ....... *G06F 1/3209* (2013.01); *H04N 21/4436* (2013.01); *H04W 52/0216* (2013.01);
(Continued)

(58) Field of Classification Search
USPC ........................................................ 713/324
See application file for complete search history.

(56) References Cited

U.S. PATENT DOCUMENTS

| | | | |
|---|---|---|---|
| 6,047,378 A | * | 4/2000 | Garrett .................. G06F 1/3209 713/300 |
| 8,249,616 B2 | | 8/2012 | Boejer |

(Continued)

FOREIGN PATENT DOCUMENTS

| | | |
|---|---|---|
| CN | 101610544 A | 12/2009 |
| CN | 101651978 A | 2/2010 |

(Continued)

OTHER PUBLICATIONS

Supplementary European Search Report in European application No. 15833234.6, dated Aug. 1, 2017, 12 pgs.
(Continued)

*Primary Examiner* — Jaweed A Abbaszadeh
*Assistant Examiner* — Volvick Derose
(74) *Attorney, Agent, or Firm* — Cooper Legal Group, LLC

(57) ABSTRACT

The embodiments of the disclosure provide a method, device and storage medium for waking up a home interconnection device. The method can include: when the home interconnection device is in a state of standby, the home interconnection device receives a first beacon frame through a wireless access point (AP) of a Wireless Fidelity (WIFI) module of the home interconnection device; the home interconnection device searches a pre-set field of the first beacon frame for a waking-up identification; and when the pre-set field of the first beacon frame comprises the waking-up identification, the home interconnection device switches from the state of standby to the state of work.

14 Claims, 3 Drawing Sheets

(51) Int. Cl.
  *H04W 84/12*   (2009.01)
  *H04W 52/02*   (2009.01)
  *H04N 21/443*  (2011.01)
  *G06F 1/3287*  (2019.01)

(52) U.S. Cl.
  CPC .......... *H04W 84/12* (2013.01); *G06F 1/3287* (2013.01); *H04W 52/0206* (2013.01); *H04W 52/0229* (2013.01); *Y02D 70/142* (2018.01); *Y02D 70/168* (2018.01)

(56) References Cited

U.S. PATENT DOCUMENTS

| | | | |
|---|---|---|---|
| 8,331,898 B2 | 12/2012 | Waters | |
| 8,532,654 B2 | 9/2013 | Richardson | |
| 8,626,344 B2 | 1/2014 | Imes | |
| 8,670,371 B2 | 3/2014 | Wentink | |
| 9,001,721 B2 | 4/2015 | Gong | |
| 2006/0089138 A1* | 4/2006 | Smith | H04W 52/0229 455/426.1 |
| 2008/0219196 A1 | 9/2008 | Ptasinski | |
| 2008/0225768 A1 | 9/2008 | Wentink | |
| 2008/0298290 A1 | 12/2008 | Wentink | |
| 2009/0010191 A1 | 1/2009 | Wentink | |
| 2009/0262675 A1* | 10/2009 | Tsai, Jr. | H04W 52/0216 370/311 |
| 2009/0298535 A1 | 12/2009 | Klein | |
| 2009/0299541 A1 | 12/2009 | Park et al. | |
| 2011/0099583 A1 | 4/2011 | Shin | |
| 2011/0176463 A1 | 7/2011 | Cowan | |
| 2012/0159546 A1 | 6/2012 | Klein | |
| 2012/0182915 A1 | 7/2012 | Wentink | |
| 2012/0324516 A1 | 12/2012 | Gold-Gavriely | |
| 2013/0077550 A1 | 3/2013 | Ptasinski | |
| 2013/0086618 A1 | 4/2013 | Klein et al. | |
| 2013/0308618 A1* | 11/2013 | Panneerselvam | G01S 5/0236 370/338 |
| 2013/0329621 A1* | 12/2013 | Kondo | H04W 52/0206 370/311 |
| 2013/0337806 A1 | 12/2013 | Barash | |
| 2014/0032004 A1 | 1/2014 | Park et al. | |
| 2014/0086124 A1* | 3/2014 | Knowles | H04W 52/0277 370/311 |
| 2014/0204278 A1 | 7/2014 | McCullough | |
| 2014/0204822 A1* | 7/2014 | Park | H04W 68/025 370/311 |
| 2014/0233443 A1* | 8/2014 | Kumar | H04L 12/12 370/311 |
| 2015/0074432 A1* | 3/2015 | Winter | G06F 1/3209 713/300 |
| 2015/0117305 A1* | 4/2015 | Palankar | H04W 40/24 370/328 |
| 2015/0189592 A1* | 7/2015 | Jafarian | H04W 52/0216 370/311 |
| 2015/0245290 A1* | 8/2015 | Liu | H04W 52/0216 370/311 |
| 2016/0165534 A1* | 6/2016 | Kim | H04W 52/0229 370/311 |

FOREIGN PATENT DOCUMENTS

| | | |
|---|---|---|
| CN | 201733443 U | 2/2011 |
| CN | 201887867 U | 6/2011 |
| CN | 102404625 A | 4/2012 |
| CN | 202309994 U | 7/2012 |
| CN | 102833831 A | 12/2012 |
| CN | 102201159 B | 6/2013 |
| CN | 103237246 A | 8/2013 |
| CN | 103974391 A | 8/2014 |
| CN | 104202221 A | 12/2014 |
| EP | 2306776 A2 | 4/2011 |
| EP | 2627131 A1 | 8/2013 |
| GB | 2506367 A | 4/2014 |
| WO | 2011124853 A1 | 10/2011 |

OTHER PUBLICATIONS

"An Overview of the HomePlug AV2 Technology", 2013, Larry Yonge, Jose Abad, Kaywan Afkhamie, Lorenzo Guerrieri, Srinivas Katar, Hidayat Lioe, Plascal Pagan!, Raffaele Riva, Daniel M. Schneider and Andress Schwager, Journal of Electrical and Computer Engineering, vol. 203, Article ID 892628, 21 pgs.
"Optimal fully adaptive power management protocols for IEEE 802.11 ad hoc wireless LANs", 2008, Zi-Tsan Chou, Ming-Luen Wu, Yu-Hsiang Lin, Rong-Hong Jan, IEEE Xplore Conference: IEEE International Symposium on Wireless Communication Systems, pp. 416-420.
"Enhanced Hybrid Drive Scheme for Power Saving in Wireless Ad-hoc Networks", 2013, Ashlyn Antoo and Rani Koshy, 2013 International Conference on Control Communication and Computing (ICCC), pp. 221-226.
"Mathematical System Modeling and Dynamic Resource Allocation through Kalman Filter based Prediction in IEEE 802.11 PSM", 2009, Jangsoo Lee and Sungchun Kim, IEEE International Conference on Industrial Technology, 6 pgs.
"Performance Evaluation of Power Save Protocols Using Carrier Sensing in Multihop Ad Hoc Networks", 2009, Abdelfettah Belghith and Wafa Akkan, 2013 ACS International Conference on Computer Systems and Applications (AICCSA), pp. 616-623.
"Part 15.3: Wireless Medium Access Control (MAC) and Physical Layer (PHY) Specifications for High Rate Wireless Personal Area Networks (WPANs)" 2003, The Institute of Electrical and Electronics Engineering, 324 pgs.
International Search Report in international application No. PCT/CN2015/075509, dated Jun. 19, 2015, 2 pgs.
English Translation of the Written Opinion of the International Search Authority in international application No. PCT/CN2015/075509, dated Jun. 19, 2015, 8 pgs.

* cited by examiner

METHOD, DEVICE AND STORAGE MEDIUM FOR WAKING UP HOME INTERCONNECTION DEVICE

TECHNICAL FIELD

The disclosure relates to the field of electronic device, and in particular to a method, device and storage medium for waking up a home interconnection device.

BACKGROUND

With the development of service such as DVB (Digital Video Broadcasting) and OTT (Over the Top), in addition to the function for providing home users with digital television service, more and more set-top boxes have functions of networking, and thus the set-top boxes become home interconnection devices. These home interconnection devices all have WIFI (Wireless-Fidelity) modules and can provide home users with the function and service for wirelessly accessing the Internet.

When a home interconnection device is in a state of standby, a user usually needs to use an infrared remote control to wake up the home interconnection device in the state of standby. However, when controlling the two working states of standby and waking-up of the home interconnection device through an infrared signal, the controlling operation is vulnerable to factors such as the relative location and the relative angle between the remote control and the home interconnection device, causing inconvenience for the user's operation and control.

SUMMARY

To solve the abovementioned technical problems, embodiments of the disclosure are expected to provide a method, device and storage medium for waking up a home interconnection device.

The technical solutions of the disclosure are implemented as follows.

In a first aspect, the embodiments of the disclosure provide a method for waking up a home interconnection device, which includes:

when the home interconnection device is in a state of standby, the home interconnection device receives a first beacon frame through a wireless access point (AP) of a WIFI module of the home interconnection device;

the home interconnection device searches a pre-set field of the first beacon frame for a waking-up identification which is used for waking up the home interconnection device in the state of standby; and when the pre-set field of the first beacon frame comprises the waking-up identification, the home interconnection device switches from the state of standby to the state of work.

In one embodiment, the step that the home interconnection device searches a pre-set field of the first beacon frame for a waking-up identification includes:

the home interconnection device parses the first beacon frame to obtain information in the pre-set field of the first beacon frame; and the home interconnection device determines whether the information in the pre-set field of the first beacon frame includes the waking-up identification.

In one embodiment, when the pre-set field of the first beacon frame does not comprise the waking-up identification, or after the home interconnection device switches from the state of standby to the state of work, the method further includes:

the home interconnection device responds to a request corresponding to the first beacon frame.

In one embodiment, the method further includes:

when the home interconnection device is in the state of work, the home interconnection device receives a second beacon frame through the wireless AP of the WIFI module of the home interconnection device;

the home interconnection device searches a pre-set field of the second beacon frame for a standby identification which is used for making the home interconnection device switch from the state of work to the state of standby; and when the pre-set field of the second beacon frame comprises the standby identification, the home interconnection device switches from the state of work to the state of standby.

In one embodiment, the step that the home interconnection device searches the pre-set field of the second beacon frame for a standby identification includes:

the home interconnection device parses the second beacon frame to obtain information in the pre-set field of the second beacon frame; and the home interconnection device determines whether the information in the pre-set field of the second beacon frame includes the standby identification.

In a second aspect, the embodiments of the disclosure further provide a storage medium having stored a set of instructions. When the instructions are executed, the instructions cause at least one processor to execute the abovementioned operations.

In a third aspect, the embodiments of the disclosure further provide a home interconnection device. The home interconnection device includes a WIFI module with a function of a wireless AP. The home interconnection device further includes a receiving module, a searching module and a switching module.

The receiving module is arranged to receive a first beacon frame through the AP of the WIFI module, when the home interconnection device is in a state of standby, and to transmit the first beacon frame to the searching module.

The searching module is arranged to search a pre-set field of the first beacon frame for a waking-up identification, and when a pre-set field of the first beacon frame comprises the waking-up identification, to trigger the switching module. The waking-up identification is used for waking up the home interconnection device in the state of standby.

The switching module is arranged to switch the home interconnection device from the state of standby to the state of work, when the searching module determines that the pre-set field of the first beacon frame comprises the waking-up identification.

In one embodiment, the searching module includes a parsing submodule and a determining submodule.

The parsing submodule is arranged to parse the first beacon frame to obtain the information in the pre-set field of the first beacon frame and to transmit the information in the pre-set field of the first beacon frame to the determining submodule.

The determining submodule is arranged to determine whether the information in the pre-set field of the first beacon frame includes the waking-up identification.

In one embodiment, the home interconnection device further includes a responding module.

The responding module is arranged to respond to a request corresponding to the first beacon frame, when the searching module determines that the pre-set field of the first beacon frame does not comprise the waking-up identification, or after the switching module switches the home interconnection device from the state of standby to the state of work.

In one embodiment, the receiving module is further arranged to receive the second beacon frame through the AP of the WIFI module, when the home interconnection device is in a state of work, and to transmit the second beacon frame to the searching module.

The searching module is further arranged to search the pre-set field of the second beacon frame for a standby identification, and when the pre-set field of the second beacon frame comprises the standby identification, to trigger the switching module. The standby identification is used for making the home interconnection device switch from the state of work to the state of standby.

The switching module is further arranged to switch the home interconnection device from the state of work to the state of standby, when the pre-set field of the second beacon frame comprises the standby identification.

In one embodiment, the parsing submodule is arranged to parse the second beacon frame to obtain the information in the pre-set field of the second beacon frame, and to transmit the information in the pre-set field of the second beacon frame to the determining submodule.

The determining submodule is further arranged to determine whether the information in the pre-set field of the second beacon frame includes the standby identification.

The embodiments of the disclosure provide a method, device and storage medium for waking up a home interconnection device. When the beacon frames received by the WIFI module of the home interconnection device from the terminal comprises the waking-up identification, the home interconnection device switches from the state of standby to the state of work. As such, constraints on the location and angle of the infrared remote control with respect to the home interconnection device when an infrared remote control wakes up the home interconnection device can be overcomed, and the user can conveniently control the two working states of the home interconnection device, i.e., the state of standby and the state of waking-up.

BRIEF DESCRIPTION OF THE DRAWINGS

In the figures, which are not necessarily drawn to scale, like reference numerals can refer to like elements in different views. Like reference numerals with different suffix letters can represent different examples of similar elements. The figures substantially show each embodiment discussed herein in way of illustration instead of limitation.

BRIEF DESCRIPTION OF THE DRAWINGS

Hereinafter, the technical solutions in the embodiments of the disclosure will be clearly and fully described with reference to the drawings in the embodiments of the disclosure.

Figure 1:
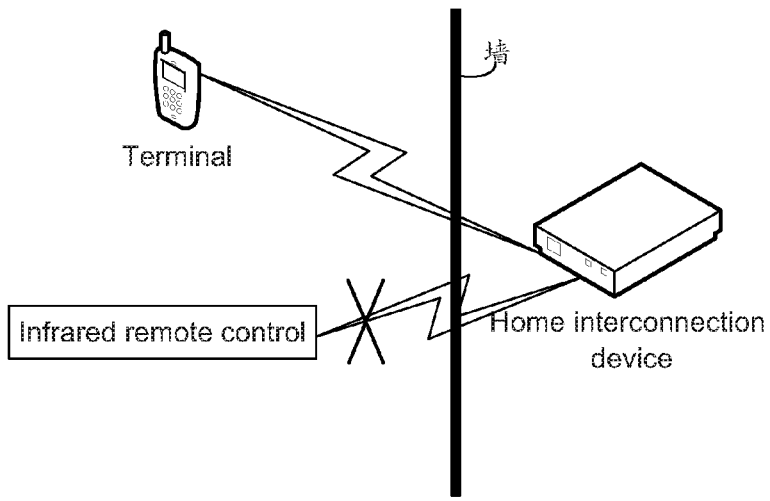
FIG. 1 is a diagram of an application scene of waking up a home interconnection device according to an embodiment of the disclosure.

With reference to FIG. 1, an application scene provided in the embodiments of the disclosure is shown. It is to be noted that the scene is just used for clearly and briefly explaining the technical solutions in the embodiments of the disclosure, without limiting the disclosure. As can be appreciated, technique in which those skilled in the art applying the technical solutions in the embodiments of the disclosure to other application scenes without creative labour also falls within the protection scope of the embodiments of the disclosure.

In the scene, a home interconnection device can be a set-top box of Digital Video Broadcasting (DVB), or a set-top box of Internet protocol television (IPTV), Over The Top (OTT) or multimode fusion etc., and the embodiment make no specific definition for this. Currently, the above-mentioned set-top boxes all have WIFI modules. Thus, the set-top boxes can provide a terminal with the function of wirelessly accessing an Access Point (AP) of Internet through the Wireless-Fidelity (WIFI) modules.

An infrared remote control is usually used for sending control instructions through an infrared ray to control the working state of the home interconnection device. Thus, there are the constraints on the location of the infrared remote control with respect to the home interconnection device, the angle of the infrared remote control with respect to the home interconnection device, and the like. As shown in FIG. 1, a wall separates an infrared remote control and terminal from a home interconnection device. For example, a user is in the bedroom and the home interconnection device is in the living room. In such case, the terminal can still access Internet through the AP of the WIFI modules, but the infrared remote control cannot control the working state of the home interconnection device.

Thus, the basic idea of the disclosure is to utilize the features that information exchange between the terminal and the AP of the WIFI module of the home interconnection device is not vulnerable to factors such as the location and angle of the terminal with respect to the AP of the WIFI module, and is just related to the strength of a wireless signal, and to control the two working states of the home interconnection device, i.e., the state of standby and the state of waking-up.

Figure 2:
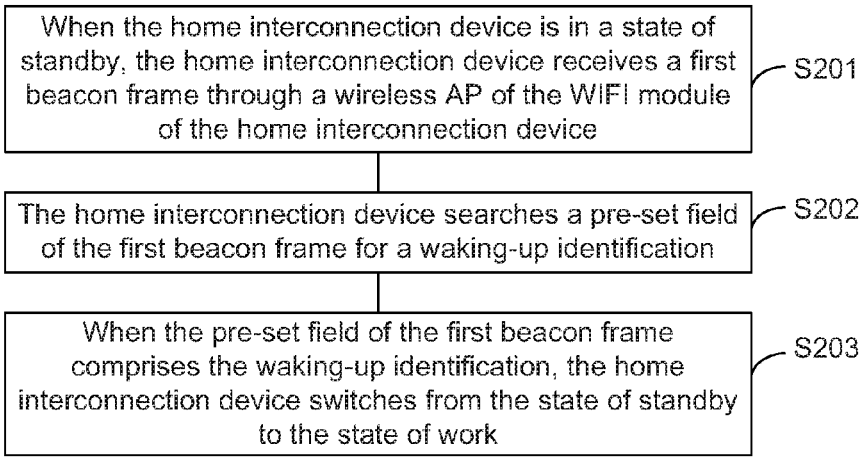
FIG. 2 is a flowchart of a method for waking up a home interconnection device according to an embodiment of the disclosure.

With reference to FIG. 2, the procedure of a method for waking up a home interconnection device provided in the embodiments of the disclosure is shown. The method can be applied to the home interconnection device with a WIFI function module, and the method can include the following steps.

In S201, when the home interconnection device is in a state of standby, the home interconnection device receives a first beacon frame through a wireless AP of the WIFI module of the home interconnection device.

In the embodiment, as can be appreciated, although the home interconnection device, such as a set-top box of DVB and a set-top box of OTT, is in a state of standby, and stops providing digital television programs to a user, a WIFI network environment still need to be provided for the user to access Internet. Therefore, in a state of standby, the WIFI module of the home interconnection device is still working.

Specifically, the WIFI module of the home interconnection device makes a terminal of the user access wireless network through the AP. Therefore, a specific application can be set on the terminal of the user to make the terminal send beacon frames to the home interconnection device through the application. These beacon frames can be used for requesting the home interconnection device to perform operations associated with the use of the beacon frames. For example, a connecting beacon frame can be used for requesting the home interconnection device to connect to the terminal; and a synchronizing beacon frame can be used for requesting the home interconnection device to synchronize with the terminal in terms of time; and so on. Therefore, the home interconnection device can receive the first beacon frame from the terminal through the AP of the WIFI module. In the embodiment, the first beacon frame can be a connecting beacon frame sent by the terminal.

In S202, the home interconnection device searches a pre-set field of the first beacon frame for a waking-up identification.

Illustratively, the waking-up identification is used for waking up the home interconnection device in the state of standby.

Specifically, after the home interconnection device receives the first beacon frame, firstly the home interconnection device may parse the first beacon frame, thus obtaining contents in the respective fields in the frame structure of the first beacon frame.

Subsequently, the home interconnection device can obtain information in a pre-set field from contents in each field in the frame structure of the first beacon frame. For example, the home interconnection device can retrieve, from the 16th reserved bit of a connecting beacon frame previously consulted and determined with the terminal, information on the reserved bit.

Then, the home interconnection device determines whether the information in the pre-set field of the first beacon frame includes waking-up identification. For example, the home interconnection device can determine whether the 16th reserved bit of the connecting beacon frame includes the waking-up identification. For example, when the information of the 16th reserved bit of the connecting beacon frame that can consult with the terminal in advance is "1", the home interconnection device of the state of standby is waken up and enters the state of work.

In S203, when the pre-set field of the first beacon frame comprises the waking-up identification, the home interconnection device switches from the state of standby to the state of work.

Specifically, in the embodiment, when the home interconnection device determines that the information of the 16th reserved bit of the connecting beacon frame is 1, the home interconnection device can switch from the state of standby to the state of work.

Alternatively, it is to be further explained that when the pre-set field of the first beacon frame does not comprise the waking-up identification, or after the home interconnection device switches from the state of standby to the state of work, the home interconnection device responds to the request corresponding to the first beacon frame.

For example, in the embodiment, when the home interconnection device determines that the information of the 16th reserved bit of the connecting beacon frame is "1", or the home interconnection device switches from the state of standby to the state of work, the home interconnection device also needs to finish the access and the connection of the terminal, because the home interconnection device receives the connecting beacon frame sent by the terminal.

The abovementioned implementations described in S201 to S203 can make the home interconnection device receive, through WIFI module of the home interconnection device, the beacon frame with the waking-up identification sent by a client to realize that the home interconnection device of the state of standby is waken up to enter the state of work. Unlike a traditional infrared control, the implementations do not need to align the infrared control with the infrared ray receiving port of the home interconnection device. As such, the control of the working state of the home interconnection device can be controlled, as long as it is within the area that the WIFI module can cover.

Figure 3:
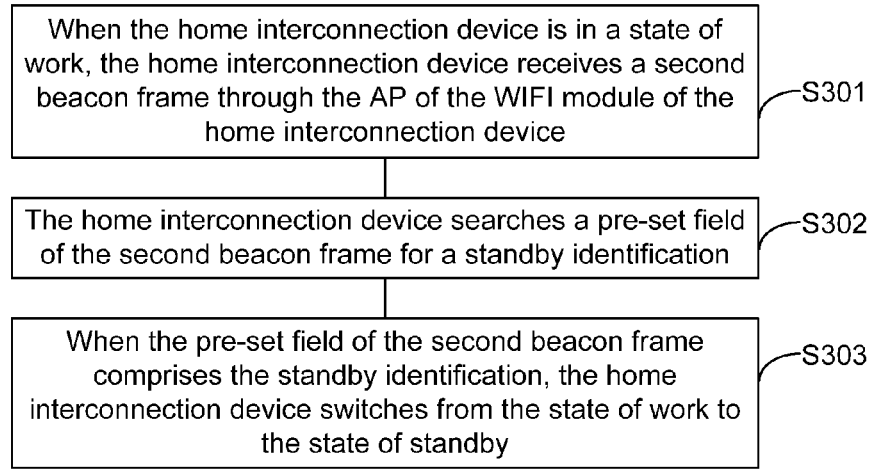
FIG. 3 is a flowchart of a method for switching a home interconnection device to a standby state according to an embodiment of the disclosure.

As can be appreciated, based on the abovementioned implementations, when the home interconnection device is in the state of work, the terminal sends the beacon frame such that the home interconnection device can switch from the state of work to the state of standby. The specific process is shown in FIG. 3 and can include the following steps.

In S301, when the home interconnection device is in the state of work, the home interconnection device receives a second beacon frame through the AP of the WIFI module of the home interconnection device.

In S302, the home interconnection device searches a pre-set field of the second beacon frame for a standby identification.

The standby identification is used for making the home interconnection device switch from the state of work to the state of standby.

Specifically, S302 can include:
the home interconnection device parses the second beacon frame to obtain information in the pre-set field of the second beacon frame; and
the home interconnection device determines whether the information in the pre-set field of the second beacon frame includes the standby identification.

In S303, when the pre-set field of the second beacon frame comprises the standby identification, the home interconnection device switches from the state of work to the state of standby.

Specifically, in the embodiment, the specific implementation of S301 to S303 is the same as the implementation of the S201 to S203 as described above and will not be repeated.

The embodiments of the disclosure provide a method for waking up a home interconnection device. When the beacon frame which is received by the WIFI module of the home interconnection device from the terminal comprises the waking-up identification, the home interconnection device switches from the state of standby to the state of work, thus overcoming constraints on the location and angle of the infrared control with respect to the home interconnection device when an infrared remote control wakes up the home interconnection device, and making a user conveniently control the two working states of the home interconnection device, i.e., the state of standby and the state of waking-up.

Based on the technical concept the same as that of the foregoing embodiments, the embodiments of the disclosure further provide a storage medium containing a set of instructions. When the instructions are executed, the instructions cause at least one processor to execute the abovementioned operations.

Figure 4:
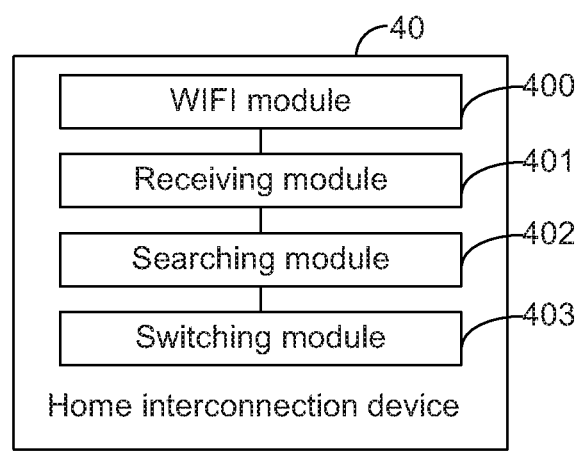
FIG. 4 is a structural diagram of a home interconnection device according to an embodiment of the disclosure.

Based on the technical concept the same as that of the foregoing embodiments, with reference to FIG. 4, a structure of the home interconnection device 40 provided in the embodiments of the disclosure is shown. The home interconnection device 40 can include a WIFI module 400 with a function of an AP, Besides, the home interconnection device 40 can further include a receiving module 401, a searching module 402 and a switching module 403.

The receiving module 401 is arranged to receive the first beacon frame through the AP of the WIFI module 400 when the home interconnection device 40 is in a state of standby, and to transmit the first beacon frame to the searching module 402.

The searching module 402 is arranged to search a pre-set field of the first beacon frame for a waking-up identification. When the pre-set field of the first beacon frame comprises the waking-up identification, the switching module 403 is triggered by the searching module 402. The waking-up identification is used for waking up the home interconnection device in the state of standby.

The switching module 403 is arranged to switch the home interconnection device from the state of standby to the state of work when the searching module 402 determines that the pre-set field of the first beacon frame comprises the waking-up identification.

In the process of practical application, the receiving module 401, the searching module 402 and the switching module 403 can be implemented by Central Processing Unit (CPU), Digital Signal Processor (DSP) or Field-Programmable Gate Array (FPGA) in the home interconnection device 40.

Figure 5:
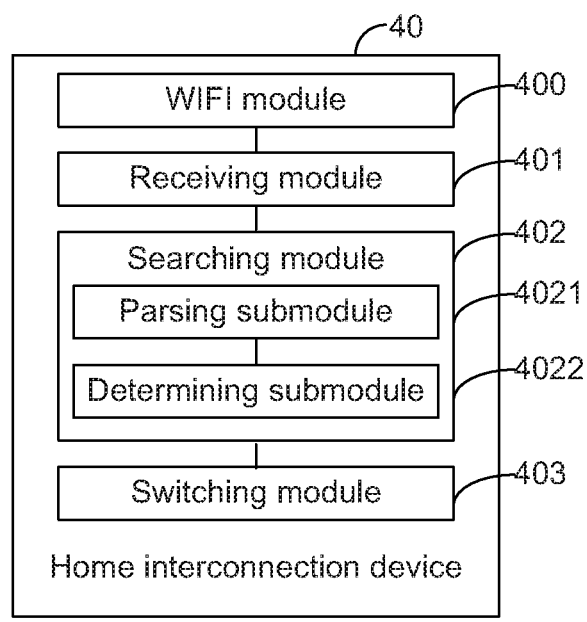
FIG. 5 is a structural diagram of another home interconnection device according to an embodiment of the disclosure.

In an example, with reference to FIG. 5, the searching module includes a parsing submodule 4021 and a determining submodule 4022.

The parsing submodule 4021 is arranged to parse the first beacon frame to obtain information in the pre-set field of the first beacon frame and to transmit the information in the pre-set field of the first beacon frame to the determining submodule 4022.

The determining submodule 4022 is arranged to determine whether the information in the pre-set field of the first beacon frame includes the waking-up identification.

Figure 6:
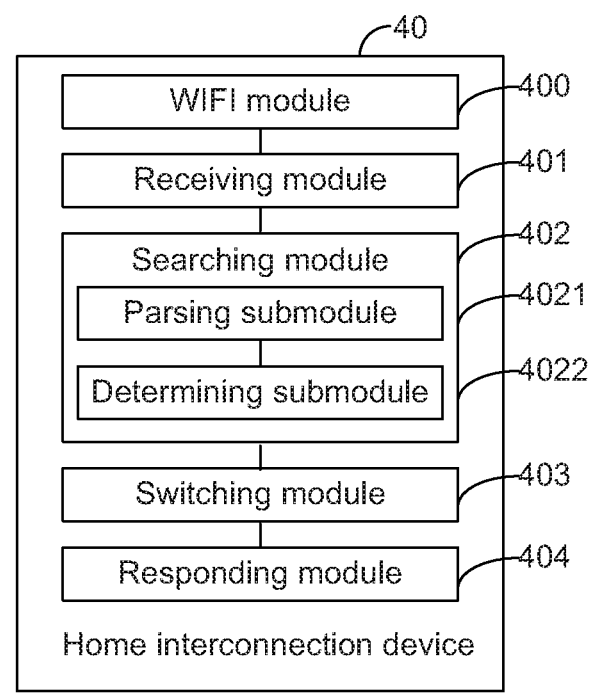
FIG. 6 is a structural diagram of yet another home interconnection device according to an embodiment of the disclosure.

In an example, with reference to FIG. 6, the home interconnection device 40 further includes a responding module 404.

The responding module 404 is arranged to respond to the request corresponding to the first beacon frame, when the searching module 402 determines that the pre-set field of the first beacon frame does not comprise the waking-up identification, or after the switching module 403 switches the home interconnection device from the state of standby to the state of work.

In the process of practical application, the responding module 404 can be implemented by the CPU, DSP or FPGA the home interconnection device 40.

As can be appreciated, based on the abovementioned implementations, when the home interconnection device 40 is in the state of work, the terminal may sends the beacon frames such that the home interconnection device 400 can switch from the state of work to the state of standby.

In an example, the receiving module 401 is further arranged to receive the second beacon frame through the AP of the WIFI module 400 when the home interconnection device 40 is in a state of work, and to transmit the second beacon frame to the searching module 402.

The searching module 402 is further arranged to search the pre-set field of the second beacon frame for a standby identification. When the pre-set field of the second beacon frame comprises the standby identification, the switching module 403 is triggered by the searching module 402. The standby identification is used for making the home interconnection device switch from the state of work to the state of stand by.

The switching module 403 is further arranged to switch the home interconnection device 40 from the state of work to the state of standby, when the pre-set field of the second beacon frame comprises the standby identification.

Specifically, the parsing submodule is further arranged to parse the second beacon frame to obtain information in the pre-set field of the second beacon frame and to transmit the information in the pre-set field of the second beacon frame to the determining submodule 4022.

The determining submodule 4022 is further arranged to determine whether the information in the pre-set field of the second beacon frame includes the standby identification.

The embodiments of the disclosure provide a home interconnection device. When the beacon frame received by the WIFI module 400 of the home interconnection device 40 from the terminal comprises the waking-up identification, the home interconnection device 40 switches from the state of standby to the state of work. As such, constraints on the location and angle of the infrared remote control with respect to the home interconnection device when an infrared remote control wakes up the home interconnection device can be overcomed, and the user can conveniently control the two working states of the home interconnection device, i.e., the state of standby and the state of waking-up.

Those skilled in the art shall understand that embodiments of the disclosure can be provided as products of method, system or computer program. Therefore, the disclosure can take the form of hardware embodiments, software embodiments or embodiments combining software and hardware. Furthermore, the disclosure can take the form of computer program products implemented on one or more computer available storage media including computer available program codes (including but not limit to a disk storage and an optical storage).

The disclosure is described with reference to the flowcharts and/or block diagrams of products of method, device system or computer program. It should be understood that each flow and/or block in the flowcharts and/or block diagrams and the combination of flows and/or blocks in the flowcharts and/or block diagrams can be realized via computer program instructions. These computer program instructions can be provided for processors of a general-purpose computer, a special-purpose computer, an embedded processor or other programmable data processing device to generate a machine so that the instructions executed by the processor of the computer or other programmable data processing device generate a device used for realizing the functions designated by one flow or more flows in the flowcharts and/or one block or more blocks in the block diagrams.

These computer program instructions can also be stored in a computer readable storage that can instruct the computer or other programmable data processing device to work in a specific way so that instructions stored in the computer readable storage generate a manufacturing product including an instruction device. The instruction device realizes the functions designated by one flow or more flows in the flowcharts and/or one block or more blocks in the block diagrams These computer program instructions can also be loaded on the computer or other programmable data processing device so that a series of operation steps can be performed on the computer or other programmable device to generate the processing realized by the computer, thus providing steps for realizing the functions designated by one flow or more flows in the flowcharts and/or one block or more blocks in the block diagrams.

The above description is just preferred embodiment of the disclosure, and is not intended to limit the protection scope of the disclosure.

INDUSTRIAL APPLICABILITY

The embodiments of the disclosure provide a method, device and storage medium for waking up a home interconnection device. When the beacon frame received by the WIFI module of the home interconnection device from the terminal comprises the waking-up identification, the home interconnection device switches from the state of standby to the state of work. As such, constraints on the location and angle of the infrared remote control with respect to the home interconnection device when an infrared remote control wakes up the home interconnection device can be overcomed, and the user can conveniently control the two working states of the home interconnection device, i.e., the state of standby and the state of waking-up.

What is claimed is:

1. A method for waking up a home interconnection device, comprising:
   when the home interconnection device is in a state of standby, receiving, by the home interconnection device, a first beacon frame from a terminal through a wireless access point (AP) of a Wireless Fidelity (WIFI) module of the home interconnection device;
   searching, by the home interconnection device, a pre-set field of the first beacon frame for a waking-up identification which is used for waking up the home interconnection device in the state of standby, wherein the pre-set field of the first beacon frame is a reserved bit of the first beacon frame which is previously consulted and determined by the home interconnection device with the terminal; and
   when the pre-set field of the first beacon frame comprises the waking-up identification, switching, by the home interconnection device, from the state of standby of the home interconnection device to a state of work, and when the pre-set field of the first beacon frame does not comprise the waking-up identification, responding, by the home interconnection device, to a request corresponding to the first beacon frame;
   wherein searching, by the home interconnection device, the pre-set field of the first beacon frame for the waking-up identification comprises:
      parsing, by the home interconnection device, the first beacon frame to obtain contents in each field of the first beacon frame;
      retrieving the contents in each field of the first beacon frame to obtain information in the pre-set field of the first beacon frame; and
      determining the waking-up identification from the information in the pre-set field of the first beacon frame.

2. The method according to claim 1, wherein after switching, by the home interconnection device, from the state of standby of the home interconnection device to the state of work, the method further comprises:
   responding, by the home interconnection device, to the request corresponding to the first beacon frame.

3. The method according to claim 1, wherein the method further comprises:
   when the home interconnection device is in the state of work, receiving, by the home interconnection device, a second beacon frame through the wireless AP of the WIFI module of the home interconnection device;
   searching, by the home interconnection device, a pre-set field of the second beacon frame for a standby identification which is used for making the home interconnection device switch from the state of work to the state of standby; and
   when the pre-set field of the second beacon frame comprises the standby identification, switching, by the home interconnection device, from the state of work of the home interconnection device to the state of standby.

4. The method according to claim 3, wherein searching, by the home interconnection device, the pre-set field of the second beacon frame for the standby identification comprises:
   parsing, by the home interconnection device, the second beacon frame to obtain information in the pre-set field of the second beacon frame; and
   determining, by the home interconnection device, whether the information in the pre-set field of the second beacon frame comprises the standby identification.

5. A home interconnection device, comprising a Wireless Fidelity (WIFI) module with a function of a wireless access point (AP) and further comprising one or more processors executing computer readable instructions for a plurality of modules comprising a receiving module, a searching module, a switching module, and a responding module, wherein
   the receiving module is arranged to receive a first beacon frame from a terminal through the wireless AP of the WIFI module when the home interconnection device is in a state of standby, and to transmit the first beacon frame to the searching module;
   the searching module is arranged to search a pre-set field of the first beacon frame for a waking-up identification, and when the pre-set field of the first beacon frame comprises the waking-up identification, trigger the switching module, wherein the waking-up identification is used for waking up the home interconnection device in the state of standby, wherein the pre-set field of the first beacon frame is a reserved bit of the first beacon frame which is previously consulted and determined by the home interconnection device with the terminal;
   the switching module is arranged to switch the home interconnection device from the state of standby to a state of work when the searching module determines that the pre-set field of the first beacon frame comprises the waking-up identification;
   the responding module is arranged to respond to a request corresponding to the first beacon frame, when the searching module determines that the pre-set field of the first beacon frame does not comprise the waking-up identification; and
   the searching module is further arranged to:
      parse the first beacon frame to obtain contents in each field of the first beacon frame;
      retrieve the contents in each field of the first beacon frame to obtain information in the pre-set field of the first beacon frame; and
      determine the waking-up identification from the information in the pre-set field of the first beacon frame.

6. The home interconnection device according to claim 5, wherein the responding module is further arranged to respond to the request corresponding to the first beacon frame after the switching module switches the home interconnection device from the state of standby to the state of work.

7. The home interconnection device according to claim 6, wherein
the receiving module is further arranged to receive a second beacon frame through the wireless AP of the WIFI module, when the home interconnection device is in the state of work, and to transmit the second beacon frame to the searching module;
the searching module is further arranged to search a pre-set field of the second beacon frame for a standby identification, and when the pre-set field of the second beacon frame comprises the standby identification, trigger the switching module, wherein the standby identification is used for making the home interconnection device switch from the state of work to the state of standby; and
the switching module is further arranged to switch the home interconnection device from the state of work to the state of standby, when the pre-set field of the second beacon frame comprises the standby identification.

8. The home interconnection device according to claim 7, wherein
the searching module is further arranged to parse the second beacon frame to obtain information in the pre-set field of the second beacon frame, and determine whether the information in the pre-set field of the second beacon frame includes the standby identification.

9. The home interconnection device according to claim 5, wherein
the receiving module is further arranged to receive a second beacon frame through the wireless AP of the WIFI module, when the home interconnection device is in the state of work, and to transmit the second beacon frame to the searching module;
the searching module is further arranged to search a pre-set field of the second beacon frame for a standby identification, and when the pre-set field of the second beacon frame comprises the standby identification, trigger the switching module, wherein the standby identification is used for making the home interconnection device switch from the state of work to the state of standby; and
the switching module is further arranged to switch the home interconnection device from the state of work to the state of standby, when the pre-set field of the second beacon frame comprises the standby identification.

10. The home interconnection device according to claim 9, wherein
the searching module is further arranged to parse the second beacon frame to obtain information in the pre-set field of the second beacon frame, and determine whether the information in the pre-set field of the second beacon frame includes the standby identification.

11. A non-transitory computer-readable storage medium having stored a set of instructions, wherein when the instructions are executed, the instructions cause at least one processor to execute a method for waking up a home interconnection device, the method comprising:
when the home interconnection device is in a state of standby, receiving, by the home interconnection device, a first beacon frame from a terminal through a wireless access point (AP) of a Wireless Fidelity (WIFI) module of the home interconnection device;
searching, by the home interconnection device, a pre-set field of the first beacon frame for a waking-up identification which is used for waking up the home interconnection device in the state of standby, wherein the pre-set field of the first beacon frame is a reserved bit of the first beacon frame which is previously consulted and determined by the home interconnection device with the terminal; and
when the pre-set field of the first beacon frame comprises the waking-up identification, switching, by the home interconnection device, from the state of standby of the home interconnection device to a state of work, and when the pre-set field of the first beacon frame does not comprise the waking-up identification, responding, by the home interconnection device, to a request corresponding to the first beacon frame;
wherein searching, by the home interconnection device, the pre-set field of the first beacon frame for the waking-up identification comprises:
parsing, by the home interconnection device, the first beacon frame to obtain contents in each field of the first beacon frame;
retrieving the contents in each field of the first beacon frame to obtain information in the pre-set field of the first beacon frame; and
determining the waking-up identification from the information in the pre-set field of the first beacon frame.

12. The non-transitory computer-readable storage medium according to claim 11, wherein after switching, by the home interconnection device, from the state of standby of the home interconnection device to the state of work, the method further comprises:
responding, by the home interconnection device, to the request corresponding to the first beacon frame.

13. The non-transitory computer-readable storage medium according to claim 11, wherein the method further comprises:
when the home interconnection device is in the state of work, receiving, by the home interconnection device, a second beacon frame through the wireless AP of the WIFI module of the home interconnection device;
searching, by the home interconnection device, a pre-set field of the second beacon frame for a standby identification which is used for making the home interconnection device switch from the state of work to the state of standby; and
when the pre-set field of the second beacon frame comprises the standby identification, switching, by the home interconnection device, from the state of work of the home interconnection device to the state of standby.

14. The non-transitory computer-readable storage medium according to claim 13, wherein searching, by the home interconnection device, the pre-set field of the second beacon frame for the standby identification comprises:
parsing, by the home interconnection device, the second beacon frame to obtain information in the pre-set field of the second beacon frame; and
determining, by the home interconnection device, whether the information in the pre-set field of the second beacon frame comprises the standby identification.

* * * * *